United States Patent
Kim et al.

(10) Patent No.: US 11,210,015 B2
(45) Date of Patent: Dec. 28, 2021

(54) DATA STORAGE DEVICE, OPERATION METHOD THEREOF, AND STORAGE SYSTEM HAVING THE SAME

(71) Applicant: SK hynix Inc., Icheon-si (KR)

(72) Inventors: Hyung Min Kim, Icheon-si (KR); Do Hun Kim, Hwaseong-si (KR); Jae Han Park, Yongin-si (KR); Hyoung Suk Jang, Seoul (KR); Hyun Mo Kang, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/536,973

(22) Filed: Aug. 9, 2019

(65) Prior Publication Data

US 2020/0150896 A1 May 14, 2020

(30) Foreign Application Priority Data

Nov. 13, 2018 (KR) ........................ 10-2018-0138827

(51) Int. Cl.
*G06F 3/06* (2006.01)

(52) U.S. Cl.
CPC .......... *G06F 3/0656* (2013.01); *G06F 3/0611* (2013.01); *G06F 3/0673* (2013.01)

(58) Field of Classification Search
CPC .... G06F 3/0656; G06F 3/0611; G06F 3/0673; G06F 12/00; G06F 13/00
See application file for complete search history.

(56) References Cited

U.S. PATENT DOCUMENTS

| | | | |
|---|---|---|---|
| 2008/0140945 A1* | 6/2008 | Salessi | G06F 3/061 711/148 |
| 2013/0159815 A1* | 6/2013 | Jung | G06F 12/0246 714/773 |
| 2014/0310721 A1* | 10/2014 | Chew | G06F 9/50 718/104 |
| 2015/0058531 A1* | 2/2015 | Yeh | G06F 12/0246 711/103 |
| 2016/0266826 A1* | 9/2016 | Ooneda | G11C 29/52 |
| 2018/0300083 A1* | 10/2018 | Volos | G06F 3/0638 |

FOREIGN PATENT DOCUMENTS

| | | |
|---|---|---|
| KR | 101351550 B1 | 1/2014 |
| KR | 101852275 B1 | 4/2018 |

OTHER PUBLICATIONS

"Sanjay R. Deshpande, Design Considerations for Multicore SoC Interconnections, Real World Multicore Embedded Systems, 2013, Elsevier Inc., pp. 119-120" (Year: 2013).*

\* cited by examiner

*Primary Examiner* — Tuan V Thai
(74) *Attorney, Agent, or Firm* — William Park & Associates Ltd.

(57) ABSTRACT

A data storage device includes a storage medium, a first buffer memory, a second buffer memory, and a controller. The controller is configured to control data input/output for the storage medium according to requests received from a host device and to store write data in the first and second buffer memories in response to a write request received from the host device.

20 Claims, 12 Drawing Sheets

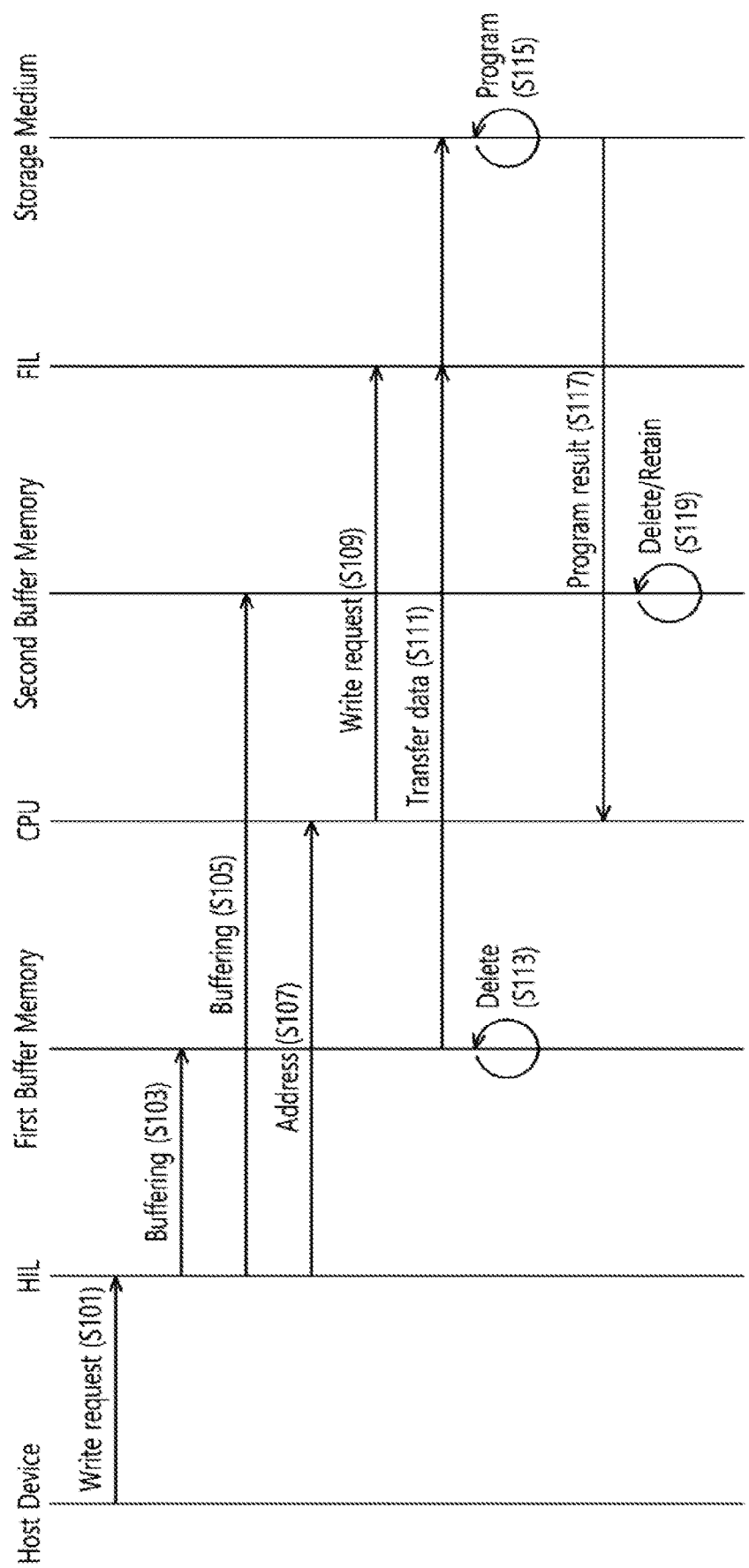

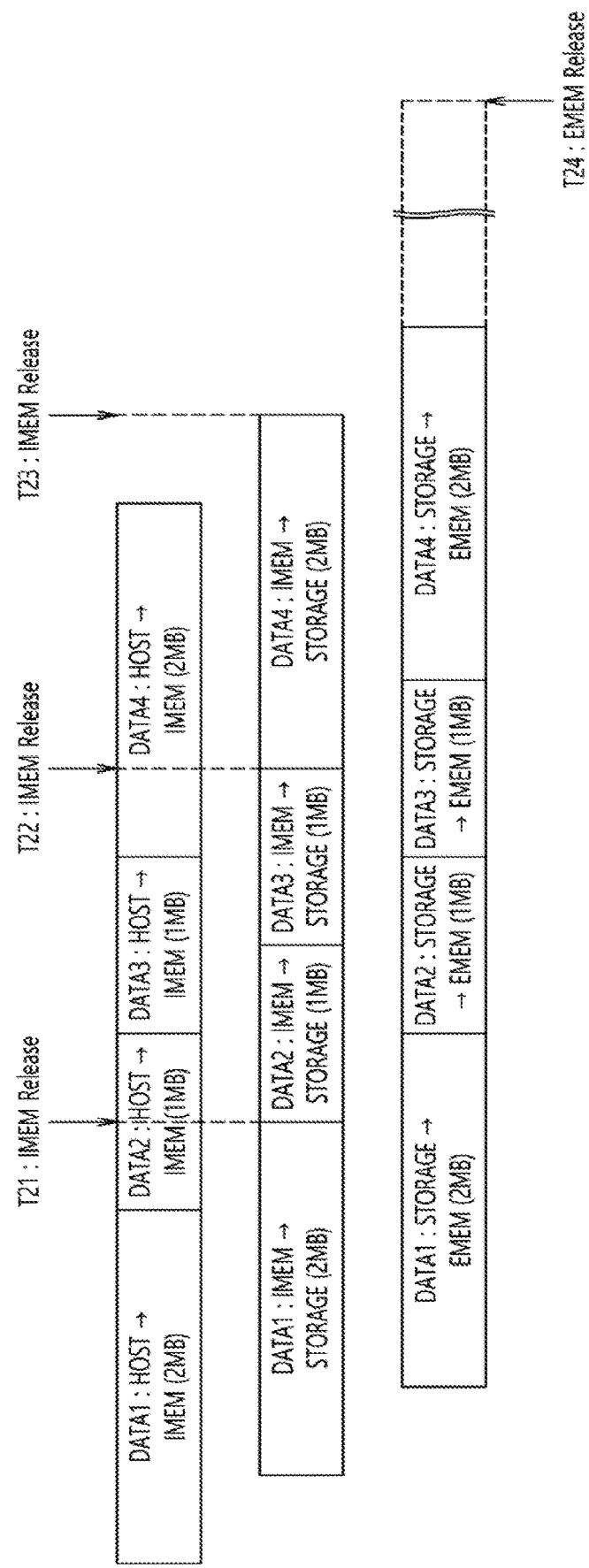

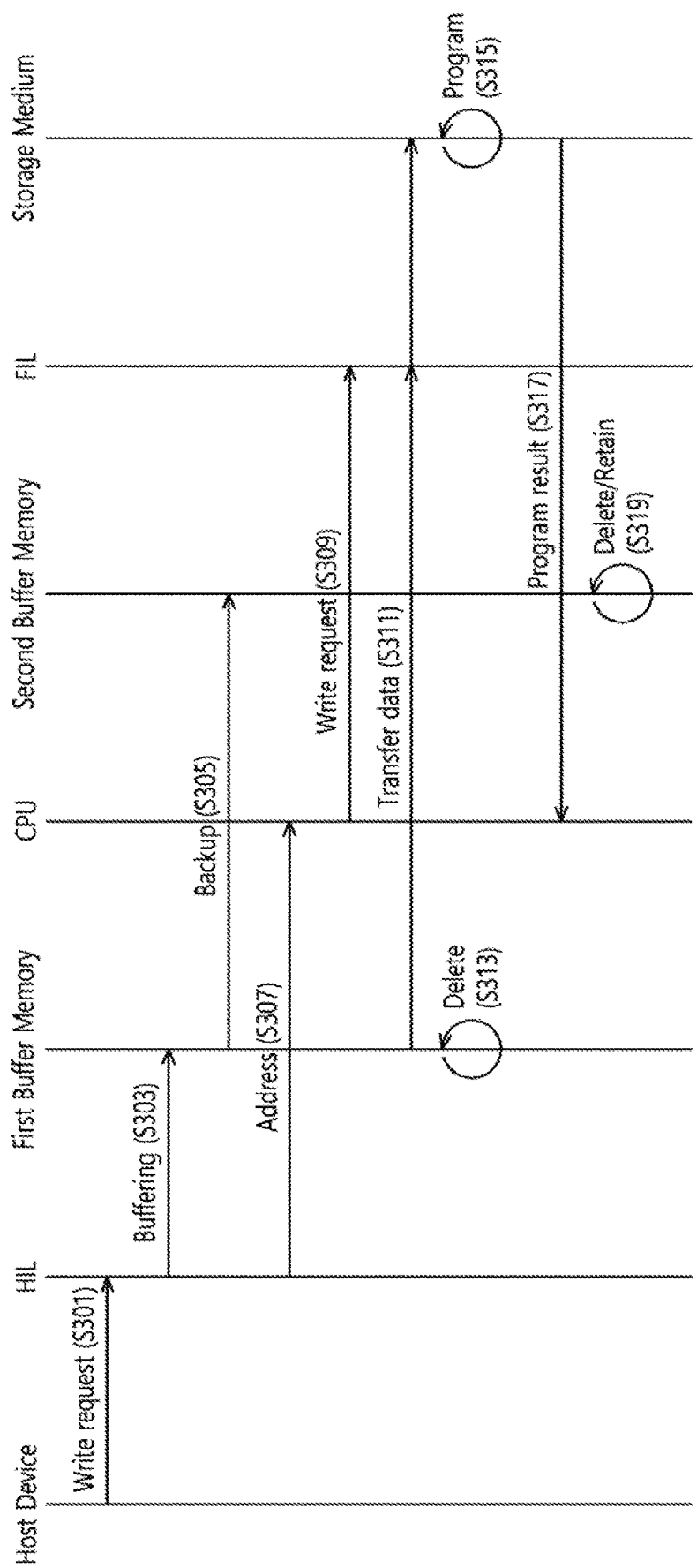

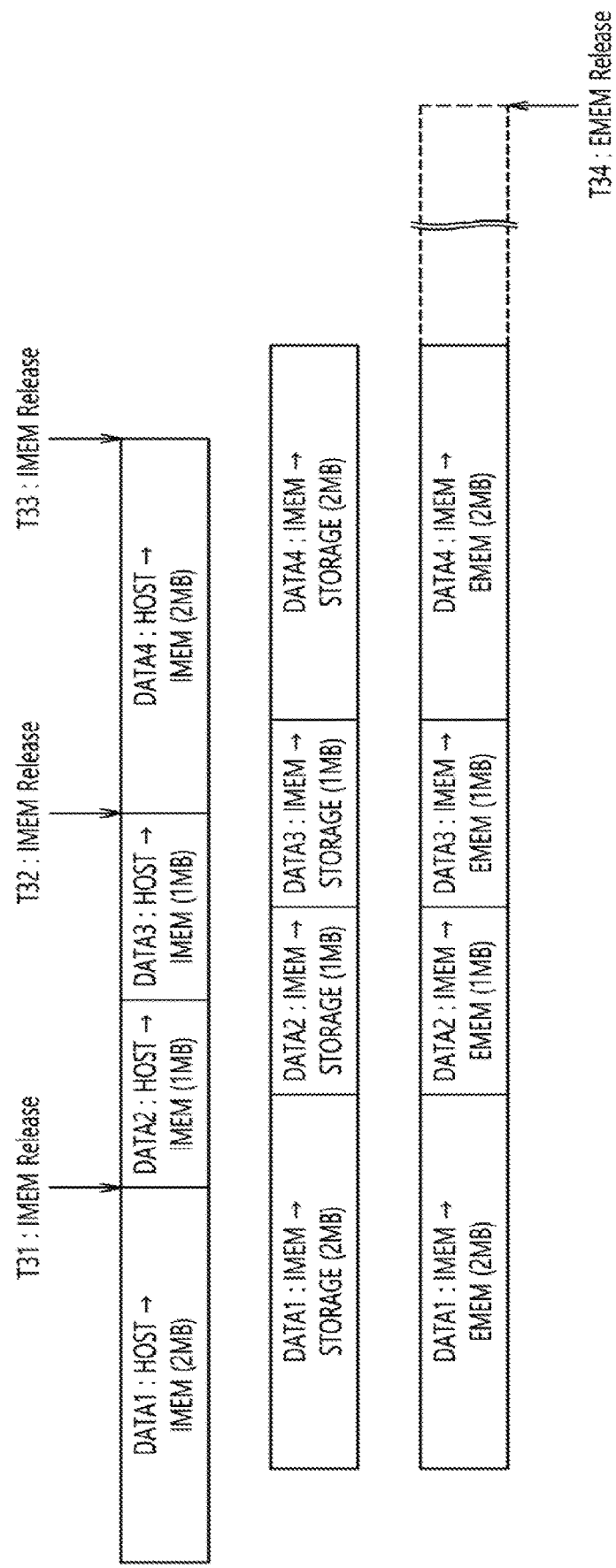

DATA STORAGE DEVICE, OPERATION METHOD THEREOF, AND STORAGE SYSTEM HAVING THE SAME

CROSS-REFERENCES TO RELATED APPLICATION

The present application claims priority under 35 U.S.C. § 119(a) to Korean application number 10-2018-0138827, filed on Nov. 13, 2018, in the Korean Intellectual Property Office, which is incorporated herein by reference in its entirety.

BACKGROUND

1. Technical Field

Various embodiments generally relate to an integrated semiconductor device, and more particularly, to a data storage device, an operation method thereof, and a storage system having the same.

2. Related Art

A storage device is coupled to a host device and performs a data input/output operation according to a request from the host device. The storage device may use various media to store data.

The host device and the storage device may have different operation speeds.

In order to overcome such a difference in operation speed, a buffer memory may be used.

The storage device may include a device for storing data on a magnetic disk, such as a hard disk drive (HDD), and a device for storing data in a semiconductor memory device, such as a solid state drive (SSD) or a memory card or specifically a nonvolatile memory.

A storage medium using a flash memory has advantages in that it has a high capacity, a nonvolatile characteristic, a low unit cost, low power consumption, and a high data processing speed.

The performance of the storage medium may be determined depending on whether the storage medium can reliably process data at high speed while providing a high capacity.

SUMMARY

In an embodiment, a data storage device may include a storage medium, a first buffer memory, a second buffer memory, and a controller. The controller may be configured to control data input/output for the storage medium according to requests received from a host device and to store write data in the first and second buffer memories in response to a write request received from the host device.

In another embodiment, a data storage device may include a storage medium, a first buffer memory, a second buffer memory, and a controller. The controller may be configured to control data input/output for the storage medium according to requests received from a host device. The controller may be further configured to store write data in the first and second buffer memories in response to a write request received from the host device, to delete the write data from the first buffer memory when the write data is outputted from the first buffer memory to the storage medium, and to control the second buffer memory not to output the write data but instead to retain the write data until a preset time.

In another embodiment, there is provided an operation method of a data storage device which includes a storage medium, a first buffer memory, a second buffer memory, and a controller configured to control data input/output for the storage medium according to requests received from a host device. The operation method may include receiving, by the controller, a write request including a write command, write data, and an address from the host device. The operation method may also include storing, by the controller, the write data to the first and second buffer memories.

In another embodiment, a storage system may include a host device, and a data storage device including a storage medium, a first buffer memory, a second buffer memory, and a controller. The controller may be configured to control data input/output for the storage medium according to requests received from a host device and to store write data in the first and second buffer memories in response to a write request received from the host device.

BRIEF DESCRIPTION OF THE DRAWINGS

FIGS. 4A and 4B are a flowchart and timing diagram for describing an operation of the data storage device, in accordance with an embodiment.

FIGS. 5A and 5B are a flowchart and timing diagram for describing an operation of the data storage device, in accordance with an embodiment.

FIGS. 6A and 6B are a flowchart and timing diagram for describing an operation of the data storage device, in accordance with an embodiment.

DETAILED DESCRIPTION

In accordance with various embodiments, a data storage device, an operation method of a data storage device and a storage system having a data storage device are described below with reference to the accompanying drawings.

Figure 1:
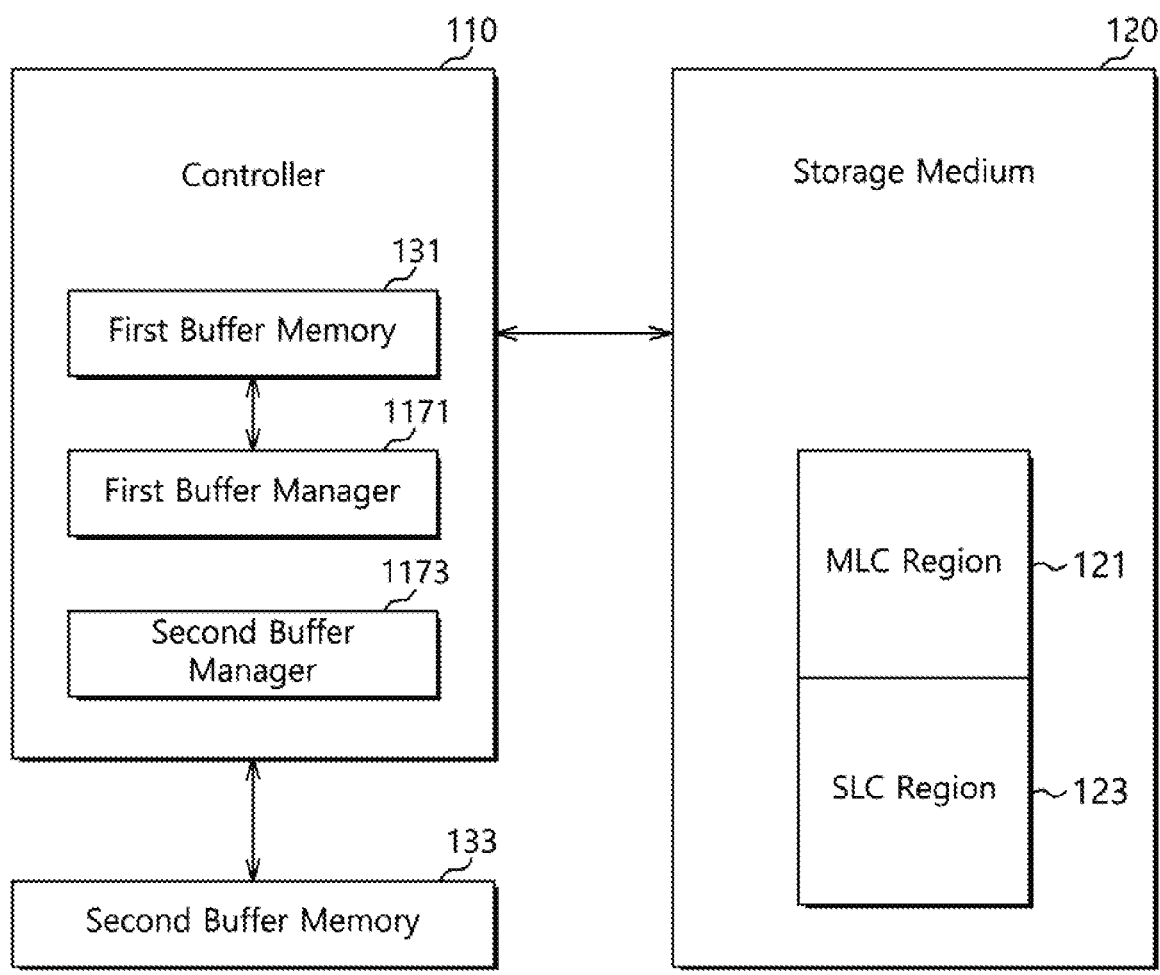
FIG. 1 is a configuration diagram illustrating a data storage device, in accordance with an embodiment.

FIG. 1 is a configuration diagram illustrating a data storage device 10, in accordance with an embodiment.

Referring to FIG. 1, the data storage device 10 may include a controller 110, a storage medium 120, and a second buffer memory 133 serving as external memory EMEM.

The controller 110 may control the storage medium 120 in response to a request from a host device. For example, the controller 110 may control the storage medium 120 to program data thereto according to a write request from the host device. Also, the controller 110 may provide data stored in the storage medium 120 to the host device in response to a read request from the host device.

The storage medium 120 may write data thereto or output data written therein, under the control of the controller 110. The storage medium 120 may be configured as a nonvolatile memory device. In an embodiment, the storage medium 120 may be implemented as a memory device selected from various nonvolatile memory devices such as an EEPROM (Electrically Erasable and Programmable ROM), NAND flash memory, NOR flash memory, PRAM (Phase-Change RAM), ReRAM (Resistive RAM), FRAM (Ferroelectric RAM), and STT-MRAM (Spin Torque Transfer Magnetic RAM). The storage medium 120 may include a plurality of dies, a plurality of chips, or a plurality of packages. Furthermore, the storage medium 120 may include single-level cells (SLCs) each configured to store one-bit data therein or multi-level cells (MLCs) each configured to store multi-bit data therein.

In an embodiment, the storage medium 120 may include an MLC region 121 and an SLC region 123. The MLC region 121 and the SLC region 123 may be implemented as one memory device or individual memory devices. The MLC region 121 may store multi-bit (2 or more bits) data per cell, and the SLC region 123 may store 1-bit data per cell.

The controller 110 may include a first buffer memory 131 serving as an internal memory IMEM, a first buffer manager 1171, and a second buffer manager 1173.

In an embodiment, the first buffer memory 131 may be packaged so as to be included in the data storage device 10. The first buffer memory 131 may be implemented as a memory device, such as an SRAM or DRAM, which operates at high speed.

The first buffer manager 1171 may manage the first buffer memory 131. In an embodiment, the first buffer manager 1171 may assign or release a region (slot) constituting the first buffer memory 131, in order to temporarily store data in the first buffer memory 131. When a region is assigned, it may indicate that data are stored in the corresponding region or data stored in the corresponding region are valid. When a region is released, it may indicate that no data are stored in the corresponding region or data stored in the corresponding region are invalidated.

In an embodiment, the first buffer manager 1171 may assign a slot to store write data in the first buffer memory 131, the write data being transferred from the host device with a write request. Then, the first buffer manager 1171 may release the slot by deleting the data of the corresponding region when the write data is transferred to the storage medium 120.

The second buffer memory 133 may serve as a space for temporarily storing write data or read data, when the data storage device 10 performs an operation of writing or reading data while interworking with the host device. The second buffer memory 133 may be provided outside the controller 110. From another point of view, the second buffer memory 133 may be packaged independently of the controller 110. The second buffer memory 133 may be implemented as a memory device such as an SRAM or DRAM, which operates at high speed.

The second buffer manager 1173 may be configured to manage the second buffer memory 133. In an embodiment, the second buffer manager 1173 may assign an empty slot of the second buffer memory 133 to store data, and release the slot by deleting the data from the slot in which the data is stored.

In an embodiment, the second buffer manager 1173 may assign a slot to store write data in the second buffer memory 133, the write data being directly or indirectly transferred from the host device with a write request from the host device. Then, the second buffer manager 1173 may release the slot by deleting the write data of the corresponding region, when the write data is successfully written to the storage medium 120.

The controller 110 may be configured to store write data in the first and second buffer memories 131 and 133, in response to a write request from the host device.

In an embodiment, the first buffer memory 131 may serve as the internal memory IMEM, which is packaged together with the controller 110 or the data storage device 10, and the second buffer memory 133 may serve as the external memory EMEM, which is packaged independently of the controller 110 or the data storage device 10.

In an embodiment, the controller 110 may directly transfer write data from the host device to the second buffer memory 133.

In an embodiment, after the write data of the first buffer memory 131 is outputted to the storage medium 120, the controller 110 may transfer the write data from the storage medium 120 to the second buffer memory 133. In this case, the controller 110 may transfer the write data from the storage medium 120 to the second buffer memory 133, or transfer only information required for checking and correcting an error of the write data to the second buffer memory 133.

In an embodiment, the controller 110 may be configured to transfer the write data to the second buffer memory 133 when the write data of the first buffer memory 131 is provided to the storage medium 120.

From a different point of view, the controller 110, in accordance with an embodiment, may be configured to store write data provided with a write request from the host device in the first buffer memory 131, delete the write data from the first buffer memory 131 when the write data is outputted from the first buffer memory 131 to the storage medium 120, store the write data provided with the write request from the host device in the second buffer memory 133 until a preset time, and delete the write data without a process of outputting the write data from the second buffer memory 133. The word "preset" as used herein with respect to a parameter, such as a preset time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

In an embodiment, the first buffer memory 131 may be configured to have a smaller capacity than the second buffer memory 133. However, other embodiments are not so limited.

In an embodiment, when a write request from the host device is a write request for the SLC region 123, the controller 110 may control the first buffer memory 131 to temporarily store write data therein. In this case, the write data might not be temporarily stored in the second buffer memory 133, and the second buffer memory 133 may be referred to only for map data searching. Therefore, power consumption by the second buffer memory 133 can be reduced or minimized.

As such, the write data temporarily stored in the first buffer memory 131 may be transferred and programmed to the storage medium 120.

Furthermore, the write data temporarily stored in the second buffer memory 133 might not be outputted to the storage medium 120, but deleted at a preset time. Therefore, because the second buffer memory 133 performs only an input operation without an output operation during a write operation for the storage medium 120, the operation efficiency of the second buffer memory 133 can be increased.

When the second buffer memory 133 performs both the write data input operation and the write data output operation, the power consumption may be increased while heat is generated. Furthermore, in order to stably support both of the write data input operation and the write data output operation, the number of input/output pads needs to be increased, or the clock speed needs to be raised. The increase in clock speed may further increase the power consumption.

In an embodiment of the present teachings, the second buffer memory 133 might be used only for inputting write data. Thus, the bandwidth and power consumption required for the second buffer memory 133 can be reduced. Furthermore, because only the write operation is performed without the read operation, the operation efficiency can be improved. As the amount of data to be processed is decreased, the clock speed may also be lowered. Therefore, the power reduction effect and the heat generation prevention effect may be further improved.

Figure 2:
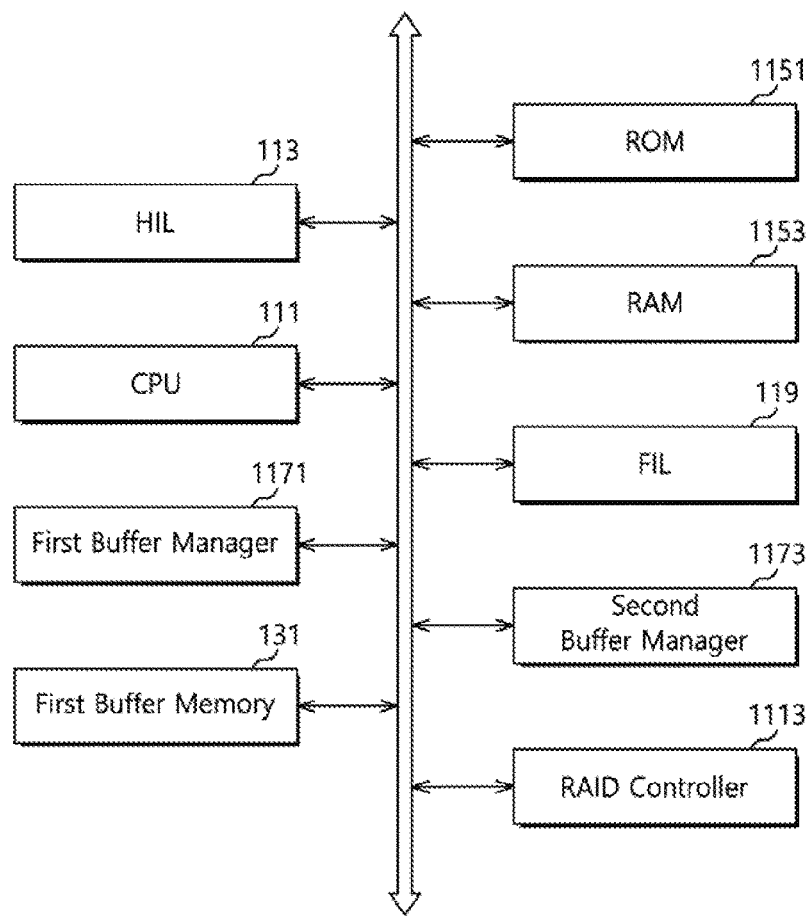
FIG. 2 is a configuration diagram illustrating a controller, in accordance with an embodiment.

FIG. 2 is a configuration diagram illustrating the controller 110, in accordance with an embodiment.

Referring to FIG. 2, the controller 110 may include a CPU 111, a host interface processor (HIL) 113, a ROM 1151, a RAM 1153, a first buffer manager 1171, a second buffer manager 1173, a memory interface processor (FIL) 119, a first buffer memory 131, and a Redundant Array of Inexpensive Disk (RAID) controller 1113.

The CPU 111 may be configured to transfer various pieces of control information to the HIL 113, the RAM 1153, the first and second buffer managers 1171 and 1173, the FIL 119, and the RAID controller 1113, the various pieces of control information being required for reading or writing data from or to the storage medium 120. In an embodiment, the CPU 111 may be operated according to firmware provided for various operations of the data storage device 10. In an embodiment, the CPU 111 may perform a function of a flash translation layer (FTL) for performing garbage collection, address mapping, or wear leveling to manage the storage medium 120, or a function of detecting and correcting an error of data read from the storage medium 120.

The HIL 113 may provide a communication channel for receiving a command, address, data, and clock signal from the host device and controlling data input/output, under control of the CPU 111. In particular, the HIL 113 may provide a physical connection between the host device and the data storage device 10. Furthermore, the HIL 113 may provide an interface with the data storage device 10 in response to the bus format of the host device. The bus format of the host device may include one or more of standard interface protocols, such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The ROM 1151 may store program codes required for an operation of the controller 110, for example, firmware or software. Furthermore, the ROM 1151 may store code data used by the program codes.

The RAM 1153 may store data required for an operation of the controller 110 or data generated by the controller 110.

The CPU 111 may control a booting operation of the data storage device 10 by loading a boot code stored in the storage medium 120 or the ROM 1151 to the RAM 1153 during the booting operation.

The first buffer manager 1171 may be configured to manage the usage state of the first buffer memory 131, and the second buffer manager 1173 may be configured to manage the usage state of the second buffer memory 133.

The first and second buffer managers 1171 and 1173 may divide the first and second buffer memories 131 and 133, respectively, into a plurality of regions (slots) and may assign the regions to temporarily store data or release the assigned regions.

The FIL 119 may provide a communication channel for transmitting/receiving signals between the controller 110 and the storage medium 120. The FIL 119 may write data to the storage medium 120 under control of the CPU, the data being temporarily stored in the first buffer memory 131. Furthermore, the FIL 119 may transfer data read from the storage medium 120 to the second buffer memory 133 to temporarily store the data.

The RAID controller 1113 may be configured to extract information required for checking and correcting an error of write data and transfer the extracted information to the second buffer memory 133, according to a write request of the host device.

In an embodiment, the CPU 111 may be configured to temporarily store write data corresponding to a write request from the host device in the first buffer memory 131 and then transfer the write data to the storage medium 120, and to release the first buffer memory 131 after the write data is transferred to the storage medium 120. Furthermore, the CPU 111 may be configured to temporarily store write data in the second buffer memory 133 and delete the write data at a preset time. At this time, the CPU 111 may transfer the write data received from the HIL 113 to the second buffer memory 133, transfer the data transferred to the storage medium 120 to the second buffer memory 133, or transfer the data of the first buffer memory 131 to the second buffer memory 133.

The device that transfers the write data to the second buffer memory 133 according to the write request from the host device and the time when the write data is transferred to the second buffer memory 133 according to the write request from the host device may be modified in various embodiments.

Figure 3:
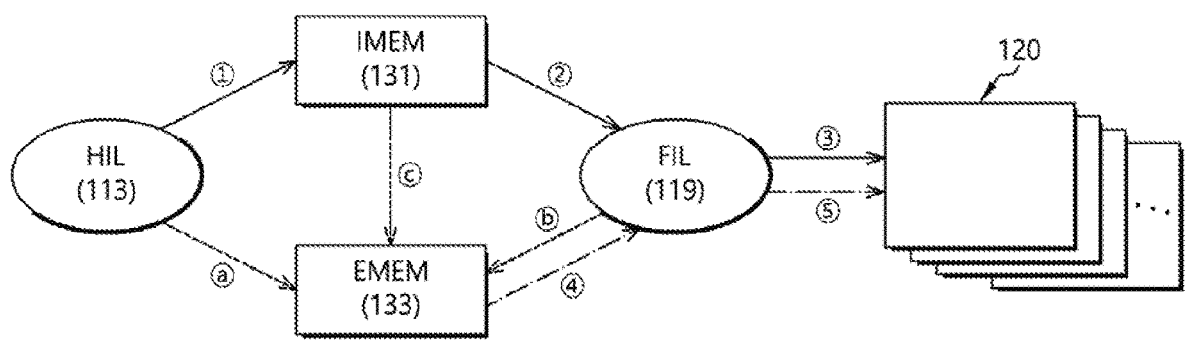
FIG. 3 is a conceptual view for describing an operation of the data storage device, in accordance with an embodiment.

FIG. 3 is a conceptual view for describing an operation of the data storage device 10, in accordance with an embodiment. In FIG. 3, a solid arrow represents a processing path of data to be written, and dotted arrows represent various paths through which data to be written is backed up into the second buffer memory. In addition, an alternate long and short dashed arrow represents a data transfer path in case of a write fail.

Referring to FIG. 3, write data transferred from the host device during a write operation may be buffered in the internal memory IMEM, i.e. the first buffer memory 131, through the HIL 113 (①). Then, the write data may be latched in the storage medium 120 through the FIL 119, and then programmed to a region corresponding to a physical address which corresponds to a logical address transferred from the host device (②). The write data buffered in the first buffer memory 131 may be deleted immediately after being outputted to the storage medium 120.

The write data may be buffered in the external memory EMEM, i.e. the second buffer memory 133.

In an embodiment, the HIL 113 may buffer the write data transferred from the host device into the second buffer memory 133 (ⓐ).

In an embodiment, after the write data is latched in the storage medium 120 through the FIL 119 from the first buffer memory 131, the write data may be transferred to the second buffer memory 133 from the storage medium 120 (ⓑ). In this case, all or part of the write data transferred to the storage medium 120 may be transferred to the second buffer memory 133, or only information required for checking and correcting an error of the write data may be transferred to the second buffer memory 133.

In an embodiment, when the write data is latched in the storage medium 120 through the FIL 119 from the first buffer memory 131, the write data may be transferred from the first buffer memory 131 to the second buffer memory 133 (ⓒ).

The data buffered in the second buffer memory 133 may be deleted at a preset time, for example, after the write data has been successfully programmed to the storage medium 120.

In an embodiment, when a target region corresponding to the host request of the host device is the SLC region, the write data might not be buffered in the second buffer memory 133, but buffered only in the first buffer memory 131. However, other embodiments are not so limited.

While the write data is transferred and programmed to the storage medium 120, a program fail may occur. In this case, the write data stored in the second buffer memory 133 may be transferred to the storage medium 120 (⑤) through the FIL 119 (④), and then reprogrammed to the storage medium 120.

First Embodiment: Simultaneous Buffering into IMEM and EMEM

Figure 4B:
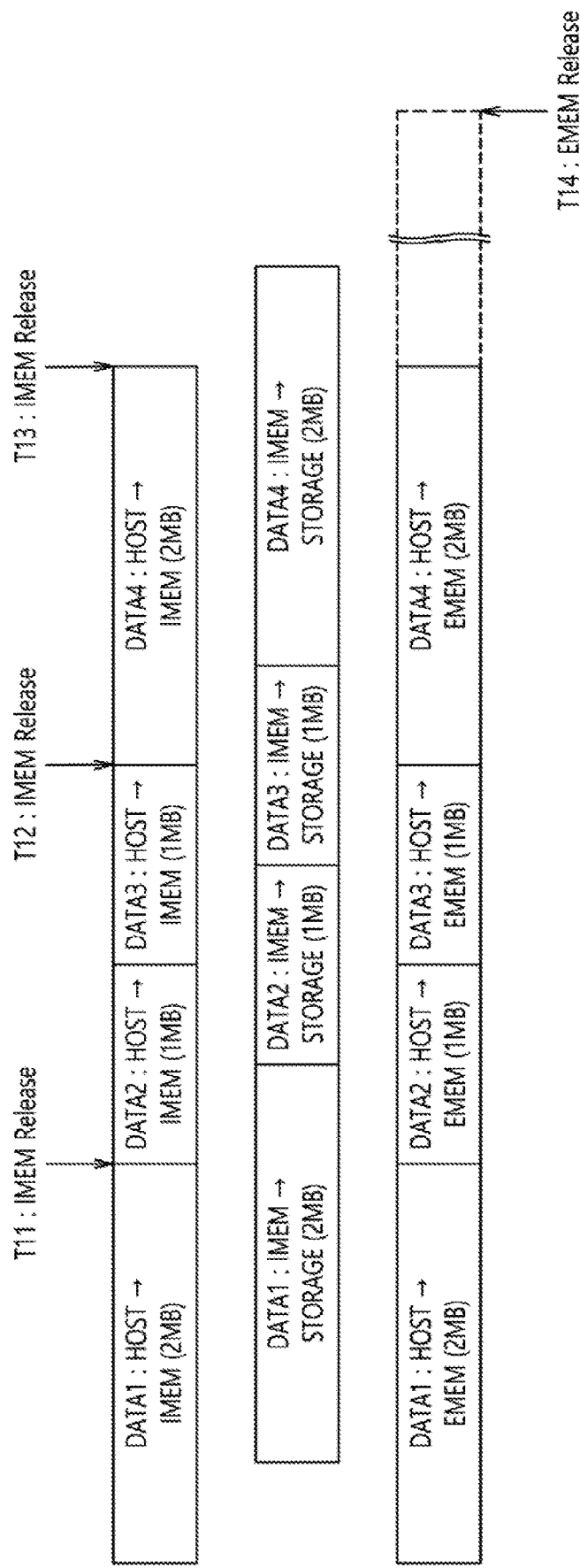

FIGS. 4A and 4B are a flowchart and timing diagram for describing an operation of the data storage device 10, in accordance with an embodiment.

As the host device transfers a write request including a write command, write data, and a logical address to the data storage device 10 at S101, the HIL 113 may transfer the write data to the first buffer memory 131 at S103. Simultaneously, the HIL 113 may transfer the write data to the second buffer memory 133 at S105.

The CPU 111 may receive the logical address from the HIL 113, the logical address being transferred by the host device, at S107. The CPU 111 may translate the logical address into a physical address, and transfer the physical address to the FIL 119 in order to request the FIL 119 to process the write request, at S109.

The storage medium 120 may receive the write data from the first buffer memory 131 according to control of the FIL 119, and latch the received write data, at S111.

As soon as the write data is transferred to the storage medium 120, the first buffer manager 1171 may release the slot by deleting the write data within the first buffer memory 131 at S113.

The storage medium 120 may program the latched write data to a memory cell at S115, and transfer the program result indicating a program success or fail to the CPU 111 at S117.

The CPU 111 may delete or retain the write data of the second buffer memory 133 depending on whether the program operation succeeded or failed, at S119. That is, the CPU 111 may release or maintain the slot assigned to store the write data in the second buffer memory 133. In an embodiment, when it is determined that the program operation succeeded, the CPU 111 may control the second buffer manager 1173 to delete the data within the second buffer memory 133. However, when it is determined that the program operation failed, the CPU 111 might not delete the data buffered in the second buffer memory 133, but instead retain the buffered data, such that the data is transferred to the storage medium 120 during a reprogram operation.

Suppose, for an embodiment, that the first buffer memory 131 has a smaller capacity than the second buffer memory 133. For example, suppose that the first buffer memory 131 has a capacity of 2 MB and the second buffer memory 133 has a capacity of 6 MB.

Referring to FIG. 4B, first data DATA1 (2 MB) from the host device may be buffered into both of the first and second buffer memories 131 and 133, under control of the HIL 113.

As soon as the first data DATA1 buffered in the first buffer memory 131 is transferred to the storage medium 120, the first buffer memory 131 may be released at time T11. At this time, the second buffer memory 133 may continuously retain the first data DATA1, and delete the first data DATA1 after a program success of the first data DATA1 is reported.

When the first buffer memory 131 is released by deleting the first data DATA1, second data DATA2 of 1 MB, which is the next write data, may be transferred to the first buffer memory 131 from the host device. Because the second buffer memory 133 still has a free space, the second data DATA2 may also be transferred to the second buffer memory 133 from the HIL 113, and buffered in the second buffer memory 133.

As the second data DATA2 of the first buffer memory 131 is transferred to the storage medium 120, the second data DATA2 may be deleted at time T12. The data of the second buffer memory 133 may be retained until the second data DATA2 is successfully programmed.

Third and fourth data DATA3 and DATA4 may be buffered and transferred to the storage medium 120 in a similar manner.

The first to fourth data DATA1 to DATA4 retained in the second buffer memory 133 may be deleted at time T14 or at another time when the CPU 111 confirms that the data are successfully programmed to the storage medium 120. Although not illustrated in FIG. 4B, when a program success of each of the write data DATA1 to DATA4 is reported by the storage medium 120 before time T14, the successfully programmed write data may be deleted from the second buffer memory 133.

Second Embodiment: Buffering into IMEM and Backup into EMEM by Storage Medium

Figure 5A:
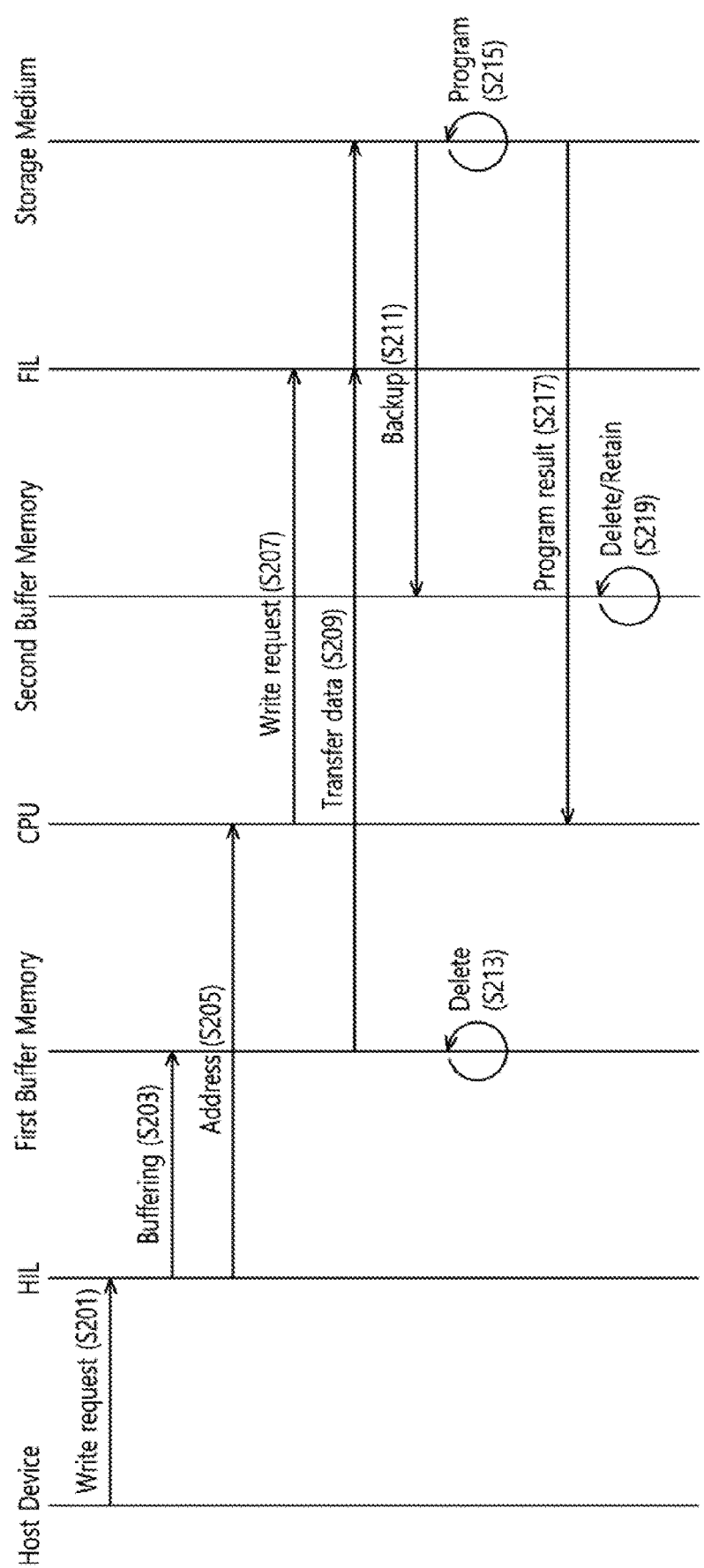

FIGS. 5A and 5B are a flowchart and timing diagram for describing an operation of the data storage device 10, in accordance with an embodiment.

As the host device transfers a write request including a write command, write data, and a logical address to the data storage device 10 at S201, the HIL 113 may transfer the write data to the first buffer memory 131 at S203.

The CPU 111 may receive the logical address from the HIL 113, the logical address being transferred from the host device, at S205. The CPU 111 may translate the logical address into a physical address, and transfer the physical address to the FIL 119 in order to request the FIL 119 to process the write request, at S207.

Under control of the FIL 119, the storage medium 120 may receive the write data from the first buffer memory 131, and latch the received write data, at S209.

When the write data is transferred to the storage medium 120, the second buffer manager 1173 may assign a slot within the second buffer memory 133, and the storage medium 120 may back up the latched write data into the second buffer memory 133 at S211. In an embodiment, the data backed up at S211 may be all or part of the write data or information required for checking and correcting an error of the write data.

As soon as the write data is backed up into the second buffer memory 133, the first buffer manager 1171 may release the slot by deleting the write data within the first buffer memory 131 at S213.

The storage medium 120 may program the latched write data to a memory cell at S215, and transfer the program result indicating a program success or fail to the CPU 111 at S217.

The CPU 111 may delete or retain the write data of the second buffer memory 133, depending on whether the program operation succeeded or failed, at S219. In an embodiment, when it is determined that the program operation succeeded, the CPU 111 may control the second buffer manager 1173 to delete the data within the second buffer memory 133. However, when the program operation failed, the CPU 111 might not delete the data buffered in the second buffer memory 133, but instead retain the buffered data, such that the data is transferred to the storage medium 120 during a reprogram operation.

Suppose, for an embodiment, that the first buffer memory 131 has a smaller capacity than the second buffer memory 133. For example, suppose that the first buffer memory 131 has a capacity of 2 MB and the second buffer memory 133 has a capacity of 6 MB.

Referring to FIG. 5B, first data DATA1 (2 MB) from the host device may be buffered into the first buffer memory 131, under control of the HIL 113.

After the first data DATA1 buffered in the first buffer memory 131 is transferred and latched into the storage medium 120, the first data DATA1 latched in the storage medium 120 may be backed up into the second buffer memory 133 from the storage medium 120.

As soon as the first data DATA1 is backed up into the second buffer memory 133 from the storage medium 120, the first buffer memory 131 may be released at time T21. At this time, the second buffer memory 133 may continuously retain the first data DATA1, until a program success of the first data DATA1 is reported.

When the first buffer memory 131 is released by deleting the first data DATA1, second data DATA2 of 1 MB, which is the next write data, may be transferred to the first buffer memory 131 from the host device.

Then, the second data DATA2 buffered in the first buffer memory 131 may be transferred and latched into the storage medium 120.

Because the second buffer memory 133 still has a free space, the second data DATA2 latched in the storage medium 120 may be backed up into the second buffer memory 133 from the storage medium 120.

As soon as the second data DATA2 is backed up into the second buffer memory 133 from the storage medium 120, the first buffer memory 131 may be released at time T22, and the second data DATA2 of the second buffer memory 133 may be retained until a program success is reported.

Third and fourth data DATA3 and DATA4 may also be buffered and transferred to the storage medium 120 in a similar manner.

The first to fourth data DATA1 to DATA4 retained in the second buffer memory 133 may be deleted at time T24 or at another time when the CPU 111 confirms that the data are successfully programmed to the storage medium 120. Although not illustrated in FIG. 5B, when a program success of each of the write data DATA1 to DATA4 is reported from the storage medium 120 before time T24, the successfully programmed write data may be deleted from the second buffer memory 133.

Third Embodiment: Buffering into IMEM and Backup into EMEM by IMEM

FIGS. 6A and 6B are a flowchart and timing diagram for describing an operation of the data storage device 10, in accordance with an embodiment.

As the host device transfers a write request including a write command, write data, and a logical address to the data storage device 10 at S301, the HIL 113 may transfer the write data to the first buffer memory 131 at S303.

When the write data is stored in the first buffer memory 131, the write data may be backed up into the second buffer memory 133 from the first buffer memory 131 at S305.

The CPU 111 may receive the logical address from the HIL 113, the logical address being transferred from the host device, at S307. The CPU 111 may translate the logical address into a physical address, and transfer the physical address to the FIL 119 in order to request the FIL 119 to process the write request, at S309.

Under control of the FIL 119, the storage medium 120 may receive the write data from the first buffer memory 131, and latch the received write data, at S311.

As soon as the write data is transferred to the storage medium 120, the first buffer manager 1171 may release the slot by deleting the write data within the first buffer memory 131 at S313.

The storage medium 120 may program the latched write data to a memory cell at S315, and transfer the program result indicating a program success or fail to the CPU 111 at S317.

The CPU 111 may delete or retain the write data of the second buffer memory 133, depending on whether the program operation succeeded or failed, at S319. In an embodiment, when it is determined that the program operation succeeded, the CPU 111 may control the second buffer manager 1173 to delete the data within the second buffer memory 133. However, when the program operation failed, the CPU 111 might not delete the data buffered in the second buffer memory 133, but instead retain the buffered data, such that the data is transferred to the storage medium 120 during a reprogram operation.

Suppose, for an embodiment, that the first buffer memory 131 has a smaller capacity than the second buffer memory 133. For example, suppose that the first buffer memory 131 has a capacity of 2 MB and the second buffer memory 133 has a capacity of 6 MB.

Referring to FIG. 6B, first data DATA1 (2 MB) from the host device may be buffered into the first buffer memory 131, under control of the HIL 113.

The first data DATA1 buffered in the first buffer memory 131 may be transferred to the storage medium 120, and simultaneously backed up into the second buffer memory 133.

As soon as the first data DATA1 is backed up into the second buffer memory 133 from the first buffer memory 131, the first buffer memory 131 may be released at time T31. At this time, the second buffer memory 133 may continuously retain the first data DATA1, until a program success of the first data DATA1 is reported.

When the first buffer memory 131 is released by deleting the first data DATA1, second data DATA2 of 1 MB, which is the next write data, may be transferred to the first buffer memory 131 from the host device.

Then, the second data DATA2 buffered in the first buffer memory 131 may be transferred and latched into the storage medium 120, and backed up into the second buffer memory 133.

As soon as the second data DATA2 is backed up into the second buffer memory 133 from the first buffer memory 131, the first buffer memory 131 may be released at time T32, and the second data DATA2 of the second buffer memory 133 may be retained until a program success is reported.

Third and fourth data DATA3 and DATA4 may also be buffered and transferred to the storage medium 120 in a similar manner.

The first to fourth data DATA1 to DATA4 retained in the second buffer memory 133 may be deleted at time T34 or at another time when the CPU 111 confirms that the data are successfully programmed to the storage medium 120. Although not illustrated in FIG. 5B, when a program success of each of the write data DATA1 to DATA4 is reported from the storage medium 120 before time T34, the successfully programmed write data may be deleted from the second buffer memory 133.

As such, the write data within the first buffer memory 131 which directly transfers data to the storage medium 120 may be deleted as soon as the write data is transferred to the storage medium 120. Thus, data to be subsequently written may be buffered into the first buffer memory 131 without delay, which makes it possible to improve the write speed.

In addition, because the write data can be retained in the second buffer memory 133 until a preset time in order to prepare against a program fail, the reliability of the program operation can be guaranteed.

Because the second buffer memory 133 is used only for inputting the write data, the power consumption can be reduced. Furthermore, the bandwidth can be almost halved, compared to when the second buffer memory 133 is used for both of the write data input operation and the write data output operation.

Figure 7:
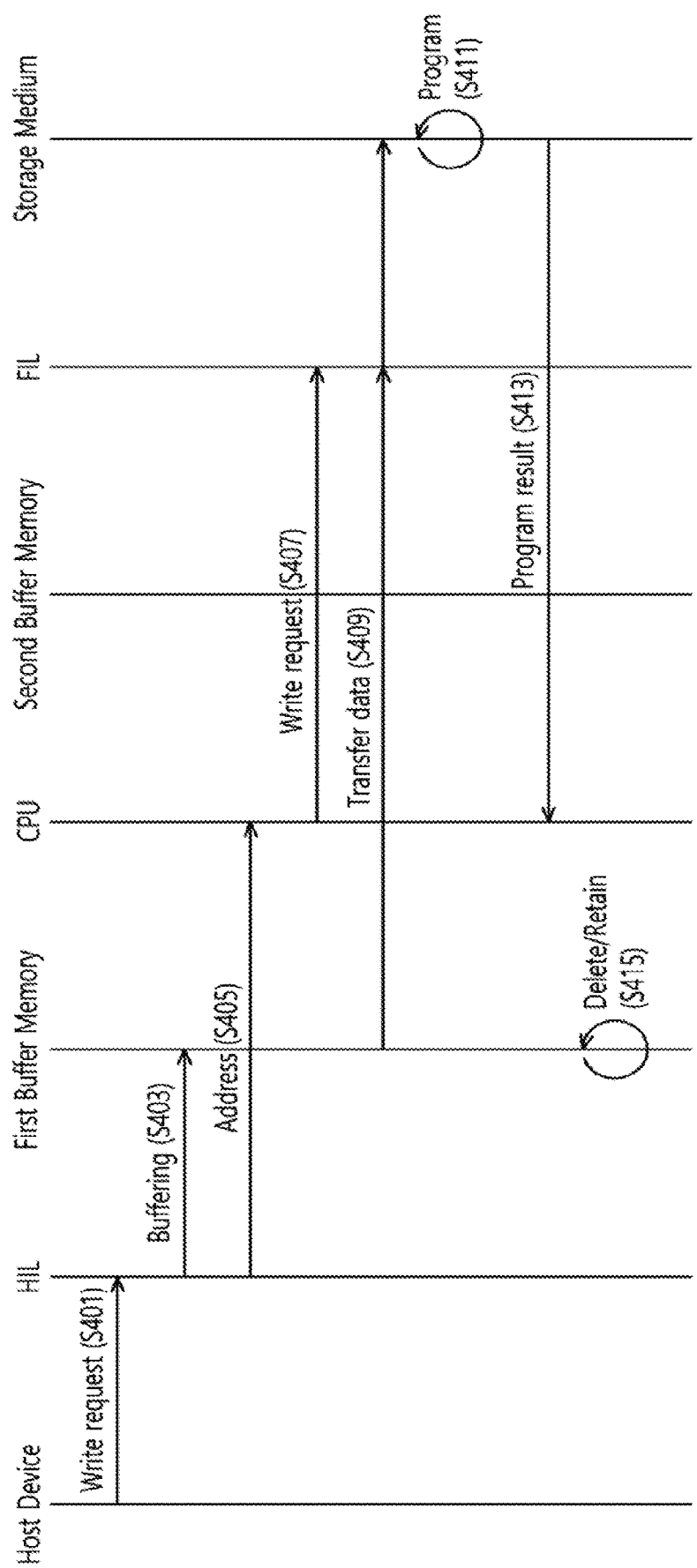
FIG. 7 is a flowchart for describing an operation of the data storage device, in accordance with an embodiment.

Fourth Embodiment: Buffering Only into IMEM Depending on Property of Write Space FIG. 7 is a flowchart for describing an operation of the data storage device 10, in accordance with an embodiment.

As the host device transfers a write request including a write command, write data, and a logical address to the data storage device 10 at S401, the HIL 113 may transfer the write data to the first buffer memory 131 at S403.

The CPU 111 may receive the logical address from the HIL 113, the logical address being transferred from the host device, at S405. The CPU 111 may translate the logical address into a physical address. At this time, the CPU 111 may determine whether a physical address region corresponding to the logical address is an MLC region or SLC region.

When the write target region is the SLC region, the CPU 111 may transfer the physical address to the FIL 119, and request the FIL 119 to process the write request, at S407.

Under control of the FIL 119, the storage medium 120 may receive the write data from the first buffer memory 131, and latch the received write data, at S409.

The storage medium 120 may program the latched write data to a memory cell at S411, and transfer the program result indicating a program success or fail to the CPU 111 at S413.

The CPU 111 may delete or retain the write data of the first buffer memory 131, depending on whether the program operation succeeded or failed, at S415. In an embodiment, when it is determined that the program operation succeeded, the CPU 111 may control the first buffer manager 1171 to delete the data within the first buffer memory 131. However, when the program operation failed, the CPU 111 might not delete the data buffered in the first buffer memory 131, but instead retain the buffered data, such that the data is transferred to the storage medium 120 during a reprogram operation.

Although not illustrated, when the write target region is the SLC region, the write data may be latched in the storage medium 120 and then backed up into the second buffer memory 133 through the method illustrated in FIG. 5A or a similar method, or backed up into the second buffer memory 133 from the first buffer memory 131 through the method illustrated in FIG. 6A or a similar method. However, other embodiments are not so limited.

In accordance with embodiments of the present teachings, a data storage device can write data to a storage medium using a plurality of buffer memories.

Furthermore, the data storage device can buffer the write data in the plurality of buffer memories, control any one buffer memory to output data to the storage medium, and control another buffer memory not to output the write data but to buffer the write data for a predetermined time, which makes it possible to improve the operation speed of the data storage device while efficiently managing the buffer memories.

Figure 8:
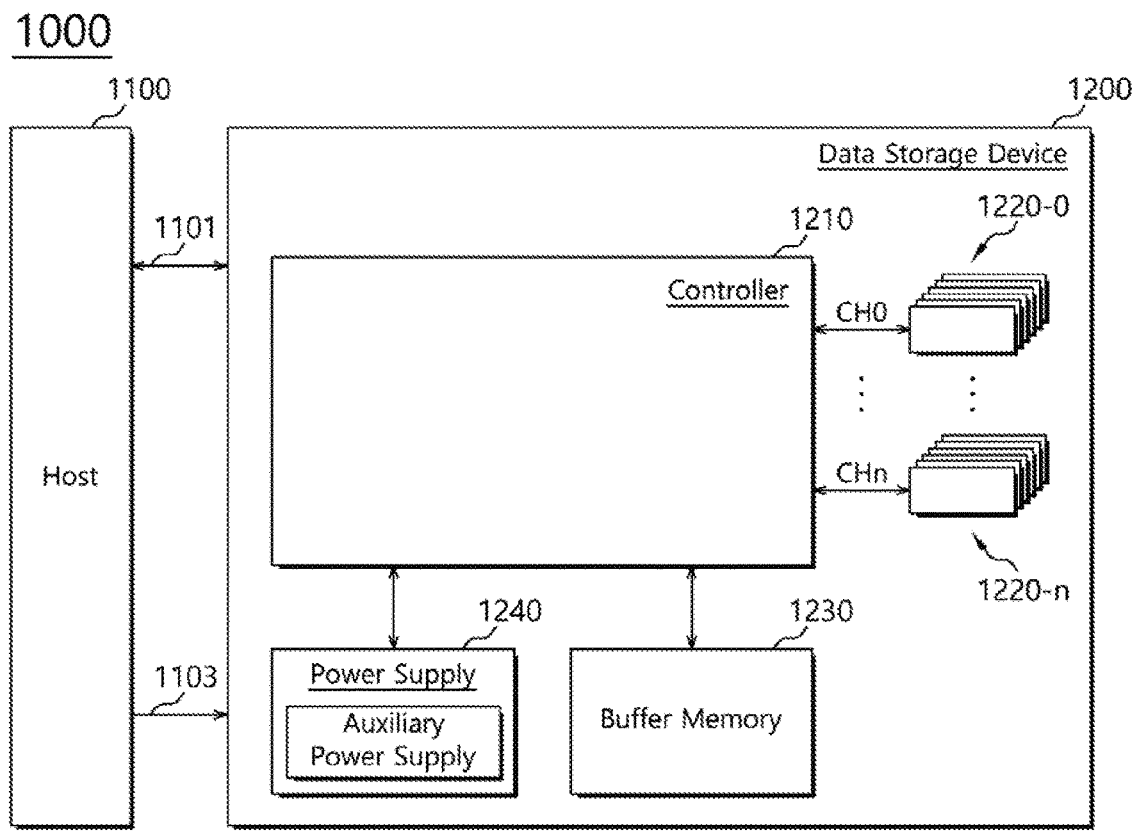
FIG. 8 is a diagram illustrating a data storage system, in accordance with an embodiment.

FIG. 8 is a diagram illustrating a data storage system 1000, in accordance with an embodiment.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-$n$, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to a firmware or a software for driving the data storage device 1200.

The buffer memory device 1230 may temporarily store data to be stored in at least one of the nonvolatile memory devices 1220-0 to 1220-$n$. Further, the buffer memory device 1230 may temporarily store the data read from at least one of the nonvolatile memory devices 1220-0 to 1220-$n$. The data temporarily stored in the buffer memory device 1230 may be transmitted to the host device 1100 or at least one of the nonvolatile memory devices 1220-0 to 1220-*n* according to control of the controller 1210.

The nonvolatile memory devices 1220-0 to 1220-*n* may be used as storage media of the data storage device 1200. The nonvolatile memory devices 1220-0 to 1220-*n* may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the inside of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 9:
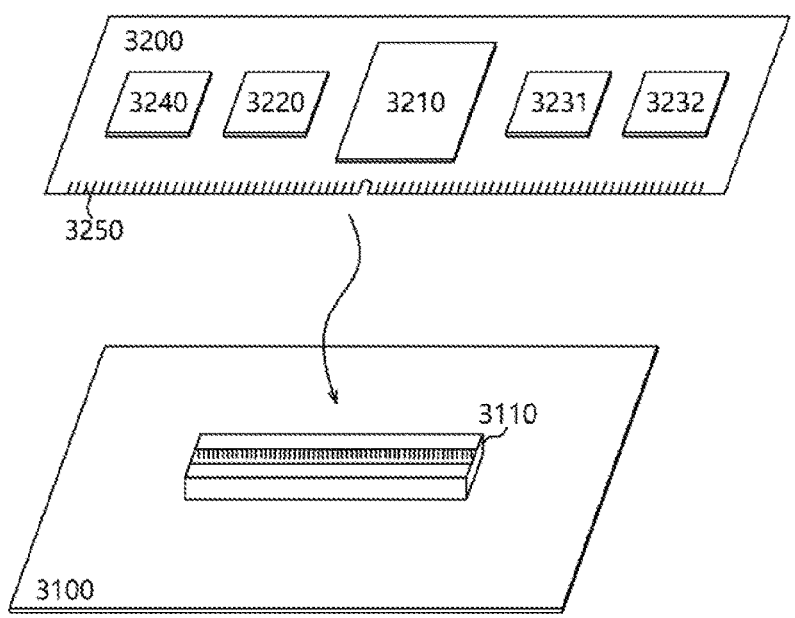
FIG. 9 and FIG. 10 are diagrams illustrating a data processing system, in accordance with an embodiment.

FIG. 9 is a diagram illustrating a data processing system 3000, in accordance with an embodiment. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 10:
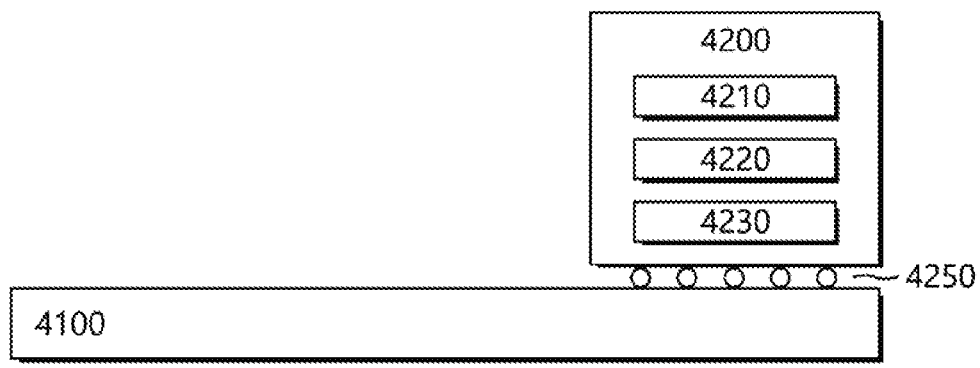

FIG. 10 is a diagram illustrating a data processing system 4000 in accordance with an embodiment. Referring to FIG. 10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 11:
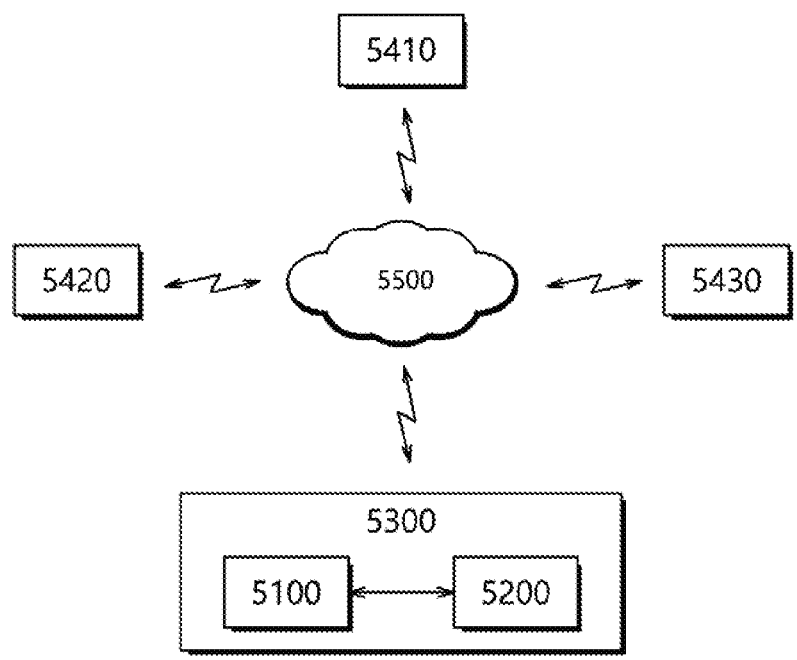
FIG. 11 is a diagram illustrating a network system including a data storage device, in accordance with an embodiment.

FIG. 11 is a diagram illustrating a network system 5000 including a data storage device, in accordance with an embodiment. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 8, the memory system 3200 shown in FIG. 9, or the memory system 4200 shown in FIG. 10.

Figure 12:
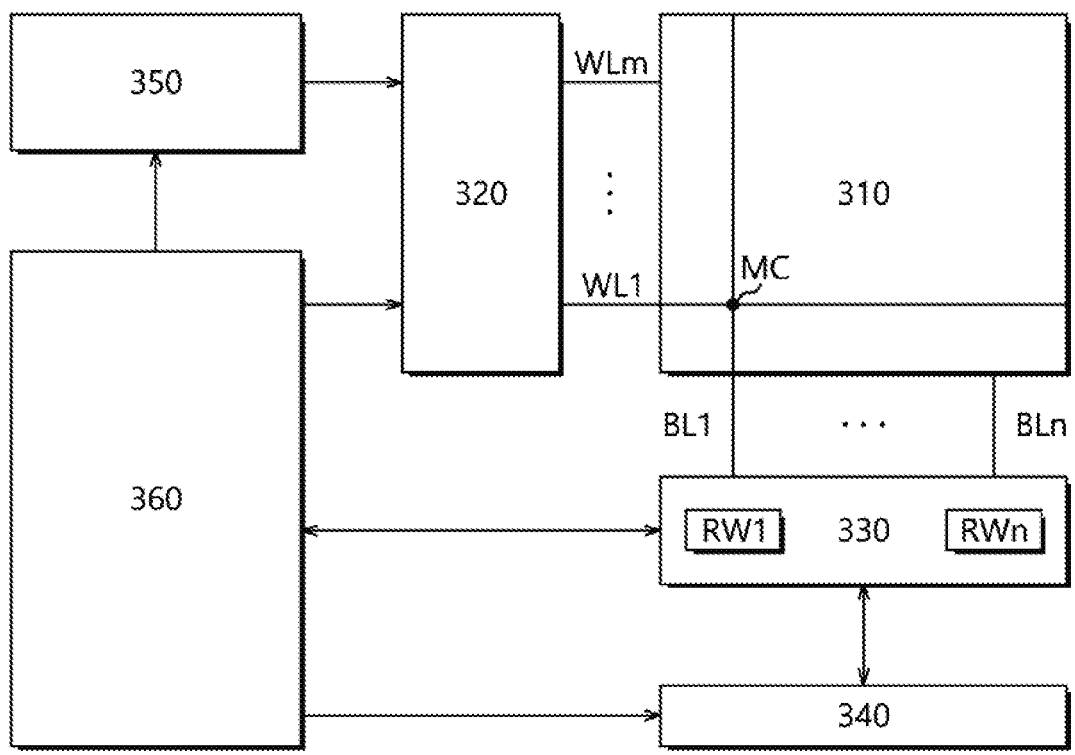
FIG. 12 is a block diagram illustrating a nonvolatile memory device included in a data storage device, in accordance with an embodiment.

FIG. 12 is a block diagram illustrating a nonvolatile memory device 300 included in a data storage device, such as the data storage device 10, in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure stacked in a perpendicular direction to the flat surface of a semiconductor substrate. Moreover, the three-dimensional memory array means a structure including NAND strings in which memory cells comprised in the NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While a limited number of embodiments have been described above, it will be understood by those skilled in the art that other embodiments are possible. Accordingly, the data storage device, the operating method thereof, and the storage system including the same, as described herein, should not be limited based on the presented embodiments.

What is claimed is:

1. A data storage device comprising:
   a storage medium;
   a first buffer memory located physically internal of a controller;
   a second buffer memory located physically external of the controller and connected to the controller; and
   the controller configured to:
      comprise a host interface processor;
      control data input/output for the storage medium according to requests received from a host device; and
      store a first write data from the host interface processor to the second buffer memory while storing the first data from the host interface processor to the first buffer memory in response to a write request received from the host device, and
   wherein the storage medium comprises both a multi-level cell region configured to store multi-bit data and a single-level cell region configured to store single-bit data, and
   the controller is further configured to determine a region of the storage medium to which the first write data is to be programmed in response to the write request received from the host device, and to store the first write data only in the first buffer memory when the write request from the host device is a write request for the single-level cell region.

2. The data storage device according to claim 1, wherein the first buffer memory, the controller, and the storage medium constitute a first package.

3. The data storage device according to claim 2, wherein the second buffer memory constitutes a second package different from the first package.

4. The data storage device according to claim 1, wherein the controller is further configured to directly transfer the first write data from the host interface processor to the first and second buffer memories.

5. The data storage device according to claim 1, wherein the first buffer memory is configured with less memory capacity than the second buffer memory.

6. A data storage device comprising:
   a storage medium;
   a first buffer memory located physically internal of a controller;
   a second buffer memory located physically external of the controller and connected to the controller; and
   a controller configured to:
      comprise a host interface processor;
      control data input/output for the storage medium according to requests received from a host device;
      store a first write data from the host interface processor to the second buffer memory while storing the first write data from the host interface processor to the first buffer memory in response to a write request received from the host device;
      delete the first write data from the first buffer memory when the first write data is outputted from the first buffer memory to the storage medium; and
      control the second buffer memory not to output the first write data but
   instead to retain the first write data until a preset time, and
   wherein the storage medium comprises both a multi-level cell region configured to store multi-bit data and a single-level cell region configured to store single-bit data, and
   the controller is further configured to determine a region of the storage medium to which the first write data is to be programmed in response to the write request received from the host device, and to store the first write data only in the first buffer memory when the write request from the host device is a write request for the single-level cell region.

7. The data storage device according to claim 6, wherein the storage medium, the first buffer memory, and the controller constitute a first package, and wherein the second buffer memory constitutes a second package different from the first package.

8. The data storage device according to claim 6, wherein the controller is further configured to directly transfer the first write data from the host interface processor to the first and second buffer memories.

9. The data storage device according to claim 6, wherein the first buffer memory is configured with less memory capacity than the second buffer memory.

10. The data storage device according to claim 6, wherein the preset time is when the storage medium reports a program success of the first write data to the controller.

11. An operation method of a data storage device comprising a storage medium, a first buffer memory located physically internal of the controller, a second buffer memory located physically external of the controller and connected to the controller, and a controller configured to control data input/output for the storage medium according to requests received from a host device, the operation method comprising:
wherein the controller comprises a host interface processor, and
receiving, by the controller, a write request including a write command, a first write data, and an address from the host device; and
storing the first write data from the host interface processor to the second buffer memory while storing the first write data from the host interface processor to the first buffer memory, by the controller, and
wherein the storage medium comprises both a multi-level cell region for storing multi-bit data and a single-level cell region for storing single-bit data, and
determining, by the controller, a region of the storage medium to which the first write data is to be programmed in response to a write request received from the host device; and
storing the first write data only in the first buffer memory when the write request from the host device is a write request for the single-level cell region.

12. The operation method according to claim 11, further comprising:
outputting the first write data from the first buffer memory to the storage medium;
deleting the first write data from the first buffer memory; and
retaining the first write data stored in the second buffer memory until a preset time before deleting the first write data from the second buffer memory without outputting the first write data from the second buffer memory.

13. The operation method according to claim 11, wherein the storage medium, the first buffer memory, and the controller constitute a first package, and wherein the second buffer memory constitutes a second package different from the first package.

14. The operation method according to claim 11, wherein storing the first write data in the first and second buffer memories comprises directly transferring, by the controller, the first write data from the host interface processor to the first and second buffer memories.

15. The operation method according to claim 11, wherein the preset time comprises a time when the storage medium reports a program success of the first write data to the controller.

16. A storage system comprising:
a host device; and
a data storage device comprising:
a storage medium,
a first buffer memory located physically internal of a controller,
a second buffer memory located physically external of the controller and connected to the controller, and
a controller configured to:
comprise a host interface processor;
control data input/output for the storage medium according to requests received from a host device; and
store a first write data from the host interface processor to the second buffer memory while storing the first data from the host interface processor to the first buffer memory in response to a write request received from the host device, and
wherein the storage medium comprises both a multi-level cell region configured to store multi-bit data and a single-level cell region configured to store single-bit data, and
the controller is further configured to determine a region of the storage medium to which the first write data is to be programmed in response to the write request received from the host device, and to store the first write data only in the first buffer memory when the write request from the host device is a write request for the single-level cell region.

17. The storage system according to claim 16, wherein the controller is further configured to, when the first write data is outputted from the first buffer memory to the storage medium:
delete the first write data from the first buffer memory; and
control the second buffer memory not to output the first write data but instead to retain the first write data until a preset time.

18. The storage system according to claim 16, wherein the storage medium, the first buffer memory, and the controller constitute a first package, and wherein the second buffer memory constitutes a second package different from the first package.

19. A data storage device comprising:
a storage medium;
a first buffer memory located physically internal of a controller;
a second buffer memory located physically external of the controller and connected to the controller; and
the controller configured to:
comprise a memory interface processor;
control data input/output for the storage medium according to requests received from a host device;
store first write data in the first buffer memory in response to a write request received from the host device;
output to the storage medium through the memory interface processor from the first buffer memory to latch the first write data; and
back up the first write data latched in the storage medium to the second buffer memory, by transfer the first write data to the second buffer memory from the storage medium.

20. The data storage device according to claim 19, wherein the controller is further configured to at least one of:
  transfer part of the latched first write data stored in the storage medium to the second buffer memory;
  transfer all of the latched first write data stored in the storage medium to the second buffer memory; and
  transfer information required for checking and correcting an error in the latched first write data to the second buffer memory.

* * * * *